US008364947B2

(12) United States Patent
Belenky

(10) Patent No.: US 8,364,947 B2
(45) Date of Patent: Jan. 29, 2013

(54) PERIOD KEYS

(75) Inventor: Yaacov Belenky, Maale Adumin (IL)

(73) Assignee: NDS Limited, Staines, Middlesex (GB)

( * ) Notice: Subject to any disclaimer, the term of this patent is extended or adjusted under 35 U.S.C. 154(b) by 1203 days.

(21) Appl. No.: 12/087,037

(22) PCT Filed: Jan. 22, 2007

(86) PCT No.: PCT/IL2007/000083
§ 371 (c)(1),
(2), (4) Date: Aug. 14, 2008

(87) PCT Pub. No.: WO2007/107976
PCT Pub. Date: Sep. 27, 2007

(65) Prior Publication Data
US 2009/0144551 A1 Jun. 4, 2009

(30) Foreign Application Priority Data
Mar. 22, 2006 (IL) .......................................... 174494

(51) Int. Cl.
*H04L 29/06* (2006.01)
(52) U.S. Cl. .......................... 713/152; 713/175; 380/277
(58) Field of Classification Search .................. 173/175; 713/175, 152
See application file for complete search history.

(56) References Cited

U.S. PATENT DOCUMENTS

| 5,412,722 A * | 5/1995 | Sherly et al. | 380/273 |
| 5,748,736 A * | 5/1998 | Mittra | 713/163 |
| 6,697,945 B2 | 2/2004 | Ishiguro et al. | |
| 7,065,214 B2 | 6/2006 | Ishiguro et al. | |
| 7,356,846 B2 * | 4/2008 | Konersmann | 726/26 |
| 2003/0229789 A1 | 12/2003 | Morais et al. | |
| 2004/0179682 A1 | 9/2004 | Soliman | |
| 2004/0266523 A1 | 12/2004 | Gentles et al. | |
| 2006/0156011 A1 * | 7/2006 | Masui | 713/178 |

FOREIGN PATENT DOCUMENTS
WO WO 02/25861 A1 3/2002
WO WO 03/061241 A1 7/2003

OTHER PUBLICATIONS

Oct. 5, 2011 Office Communication in connection with prosecution of EP 07 706 026.7.
Mar. 7, 2008 Written Opinion of International Searching Authority.

* cited by examiner

*Primary Examiner* — Jung Kim
*Assistant Examiner* — Ghodrat Jamshidi
(74) *Attorney, Agent, or Firm* — Husch Blackwell LLP

(57) ABSTRACT

A method for securing encryption keys includes providing two device, each including secure and insecure hardware, generating in each secure hardware at least two period keys stored in the secure hardware, generating in each secure hardware a plurality of session keys stored in either secure or insecure hardware on the generating device, for each secure hardware, encrypting at least one of the generated plurality of session keys according to a first of the two period keys included in each secure hardware, encrypting at least one of the plurality of session keys generated in each device according to a second of the two period keys included in each secure hardware, when a session is established between the two devices, decrypting one encrypted session key in each device, and establishing an encrypted session between both devices, where the period keys included in both devices are periodically regenerated.

22 Claims, 5 Drawing Sheets

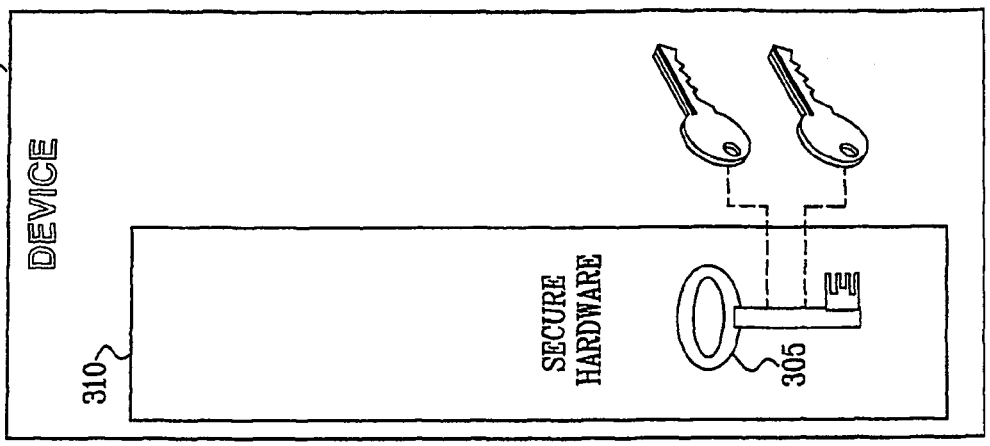
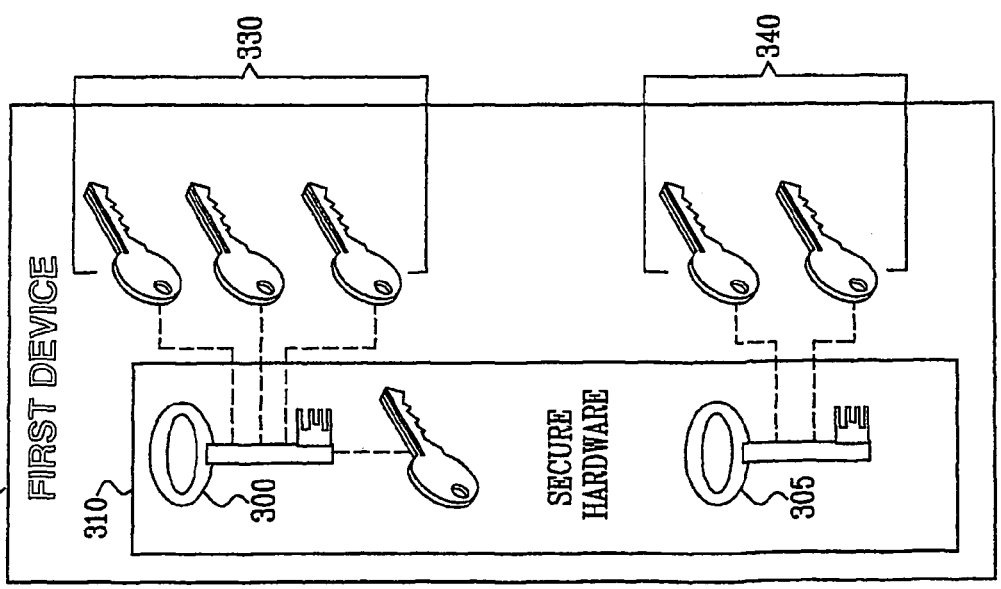

US 8,364,947 B2

PERIOD KEYS

RELATED APPLICATION INFORMATION

The present application is a 35 USC §371 application of PCT/IL2007/000083, filed on 22 Jan. 2007 and entitled "Period Keys", which was published in the English language with International Publication Number WO 2007/107976, and which claims the benefit of priority based on IL Patent Application serial number 174494, filed 22 Mar. 2006.

FIELD OF THE INVENTION

The present invention relates to a system for securing encryption keys.

BACKGROUND OF THE INVENTION

The use of encryption in establishing a session between devices is well known in the art. For example and without limiting the generality of the foregoing, a data session using HTTPS comprises transfer of encrypted data using a version of the Secure Socket Layer (SSL) or Transport Layer Security (TLS) protocols. Data transferred using HTTPS is considered to have reasonable protection from eavesdroppers and man-in-the-middle attacks.

The disclosures of all references mentioned throughout the present specification, as well as the disclosures of all references mentioned in those references, are hereby incorporated herein by reference.

SUMMARY OF THE INVENTION

The present invention seeks to provide an improved system for securing encryption keys.

There is thus provided in accordance with a preferred embodiment of the present invention providing a first device and a second device, the first device including first secure hardware and first insecure hardware, and the second device including second secure hardware and second insecure hardware, generating in the first secure hardware at least two period keys, the at least two period keys stored in the first secure hardware, generating in the first secure hardware a plurality of session keys, the session keys being stored in either the first secure hardware or the first insecure hardware, encrypting at least one of the plurality of session keys generated in the first device according to a first of the two period keys included in the first secure hardware, encrypting at least one of the plurality of session keys generated in the first device according to a second of the two period keys included in the first secure hardware, generating in the second secure hardware at least two period keys, the at least two period keys stored in the second secure hardware, generating in the second secure hardware a plurality of session keys, the session keys being stored in either the second secure hardware or the second insecure hardware, encrypting at least one of the plurality of session keys generated in the second device according to a first of the two period keys included in the second secure hardware, encrypting at least one of the plurality of session keys generated in the second device according to a second of the two period keys included in the second secure hardware, at a time when a session is established between the first device and the second device, decrypting one encrypted session key in the first device and decrypting one encrypted session key in the second device, and establishing an encrypted session between first device and the second device, the encrypted session being encrypted according to the one decrypted session key included in the first device and the one decrypted session key included in the second device, wherein the at least two period keys included in the first device and the at least two period keys included in the second device are periodically regenerated in order to produce new period keys, thereby rendering useless any session keys encrypted according to an old period key.

BRIEF DESCRIPTION OF THE DRAWINGS

The present invention will be understood and appreciated more fully from the following detailed description, taken in conjunction with the drawings in which:

FIGS. 3A-3D depict regeneration of one period key and session keys associated with the one period key within the system of FIG. 1.

DETAILED DESCRIPTION OF A PREFERRED EMBODIMENT

Figure 1:
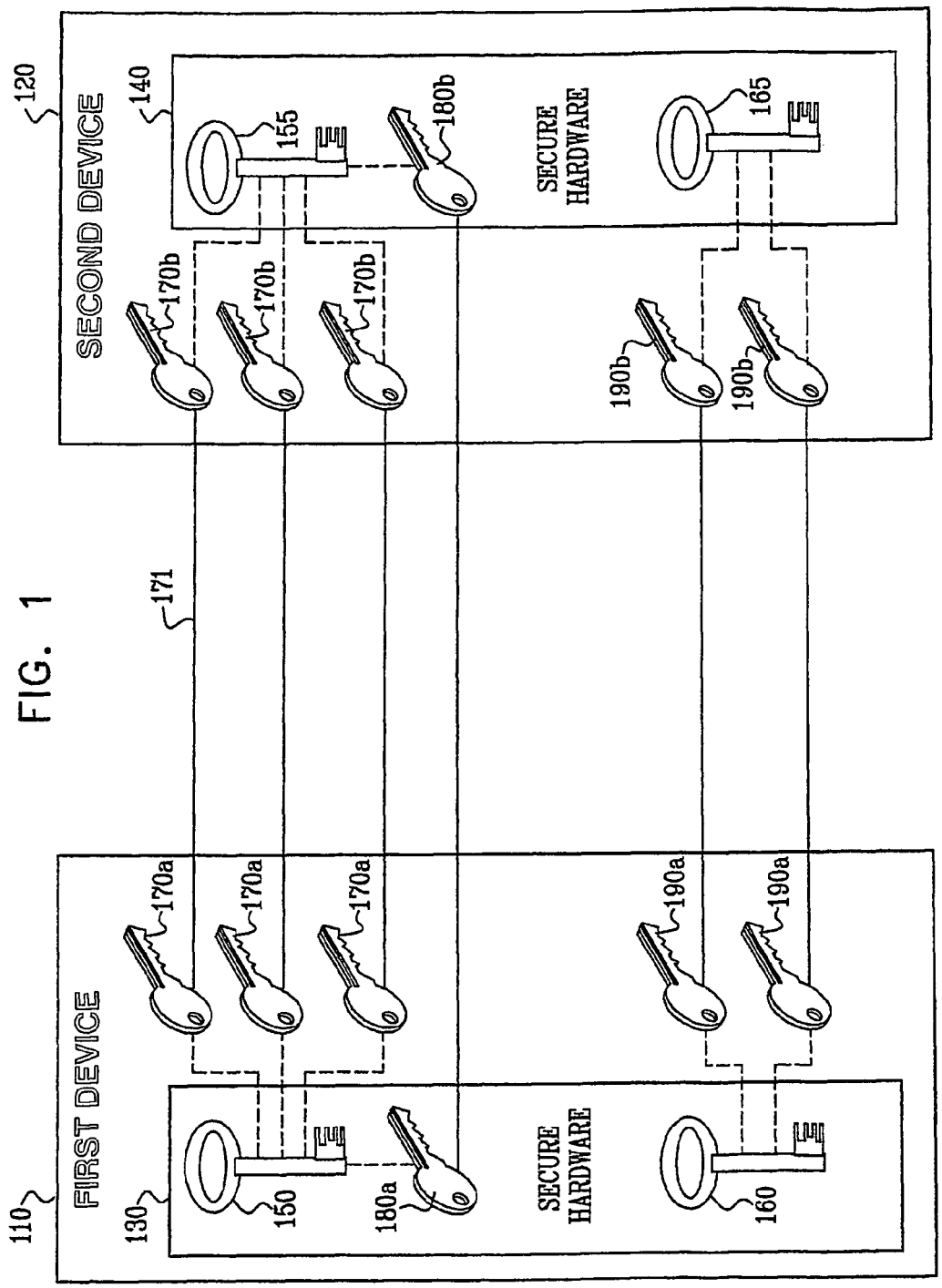
FIG. 1 is a simplified block diagram illustration of a system providing a plurality of encrypted communication sessions between a first device and a second device, the system being constructed and operative in accordance with a preferred embodiment of the present invention.

Reference is now made to FIG. 1, which is a simplified block diagram illustration of a system providing a plurality of encrypted communication sessions between a first device 110 and a second device 120, the system being constructed and operative in accordance with a preferred embodiment of the present invention. The system of FIG. 1 comprises the first device 110 and the second device 120, and, at times, preferably also comprises at least one communication session between the first device 110 and the second device 120.

The first device 110 and second device 120 comprise a combination of hardware and software, which, for ease of depiction, is not shown in detail. The first device 110 and second device 120 further preferably each comprise secure hardware 130, 140. The secure hardware preferably comprises a plurality of period keys 150, 155, 160, 165. At least one session key 170a, 170b, 180a, 180b, 190a, 190b is preferably encrypted according to a corresponding one of the plurality of period keys 150, 155, 160, 165.

According to a number of available slots in the secure hardware 130, 140, some session keys 180a, 180b are preferably stored in secure hardware. Other session keys 170a, 170b, 190a, 190b are preferably stored in insecure hardware. Those skilled in the art will appreciate that it is preferable that all session keys 170a, 170b, 180a, 180b, 190a, 190b be stored in secure hardware. Nevertheless, in some systems, it may not be possible to store all session keys 170a, 170b, 180a, 180b, 190a, 190b in secure hardware. Therefore, it is preferable that all session keys 170a, 170b, 180a, 180b, 190a, 190b not stored the secure hardware 130, 140 be encrypted.

The operation of the system of FIG. 1 is now briefly described. At least two period keys 150, 160 are preferably comprised in secure hardware 130 on the first device 110. The at least two period keys 150, 160 preferably comprise internally generated keys, generated internally to the secure hardware 130. At predefined intervals the two period keys 150, 160 are regenerated, so that each of the two period keys 150, 160 are replaced with new period keys, as will be explained below.

Each session key 170a, 180a, 190a is preferably associated with one of the period keys 150, 160. The session keys 170a, 180a, 190a are preferably encrypted according to their associated period key. Thus, in the preferred embodiment depicted in FIG. 1, session keys 170a and 180a are encrypted according to period key 150, and session keys 190a are encrypted according to period key 160.

For each secure communication session 171 between the first device 110 and the second device 120, a pair of session keys 170a, 170b, preferably encrypts the secure communication session.

Those skilled in the art will appreciate that, as explained above, some of the session keys 180a are preferably stored in secure hardware. Remaining session keys are preferably stored in insecure hardware. For example and without limiting the generality of the foregoing, if a device comprises a limited number of memory slots available in secure hardware for storing session keys, one or more of the plurality of session keys 170a, 190a is preferably swapped out from secure memory to memory comprised in insecure hardware. The one or more of the plurality of session keys 170a, 190a is preferably stored encrypted and preferably and optionally digitally signed.

When the first device 110 initiates a secure communication session 171 with the second device 120, and the communication session is to be encrypted by a session key 170a stored in insecure hardware, the session key is preferably decrypted according to period key 150 associated with the session key 170a. The decrypted session key 170a then preferably serves as an encryption key in the first device 110, preferably in tandem with either a corresponding session key 170b comprised in insecure hardware in the second device 120, or, alternatively and preferably in tandem with a corresponding session key 180b comprised in secure hardware 140 in the second device 120.

Figure 2:
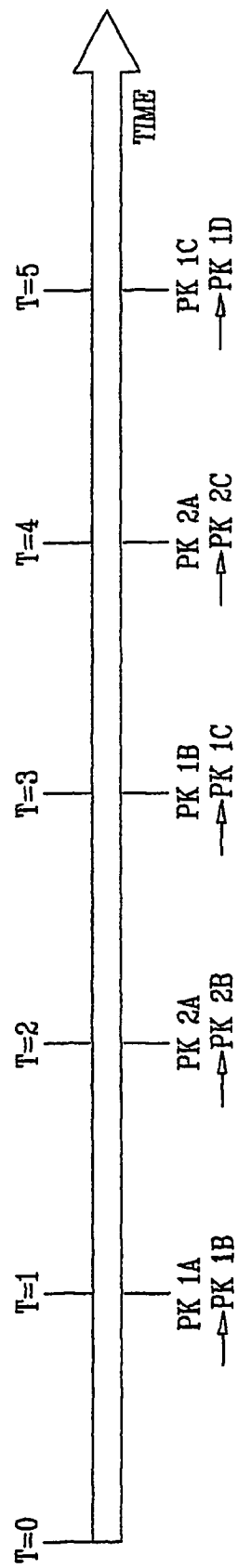
FIG. 2 is a timeline showing timing of regeneration of period keys in the system of FIG. 1.

Reference is now made to FIG. 2, which is a timeline showing timing of regeneration of period keys in the system of FIG. 1. The period keys 150, 155, 160, 165 (FIG. 1) are preferably regenerated in such a fashion that at any moment it is predictable which period key 150, 155, 160, 165 (FIG. 1) is next to be regenerated. It is appreciated that although the timeline of FIG. 2 is a timeline of regeneration of period keys in a single device, the period keys 150, 155, 160, 165 (FIG. 1) are comprised in different devices. Therefore, two timelines, not necessarily comprising the same period, would be necessary to depict regeneration of specific period keys depicted in the first device 110 (FIG. 1) and the second device 120 (FIG. 1).

At time t=1, period key PK1A is regenerated and replaced with period key PK1B. Likewise, at time t=2, period key PK2A is regenerated, and replaced with period key PK2B. At time t=3, period key PK1B is regenerated, and replaced with period key PK1C, and so forth.

Period keys are preferably regenerated using a mechanism which preferably does not depend on insecure software. For example and without limiting the generality of the foregoing, a regeneration period is preferably taken from a signed self-certificate internally verified by the secure hardware 130, 140 (FIG. 1). Furthermore, the timing of period key regeneration is preferably regulated by a secure timer (not depicted).

Figure 3D:
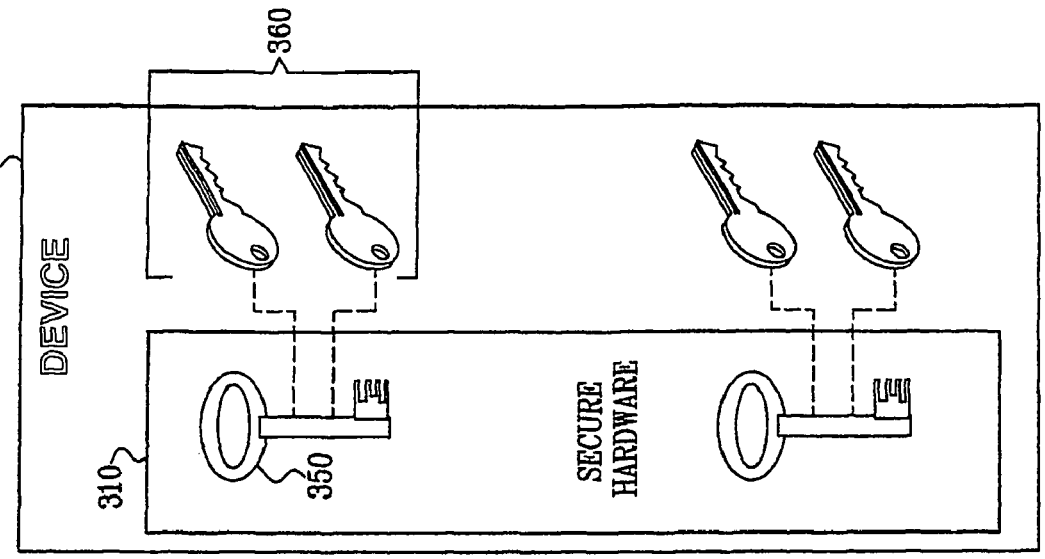
Figure 3C:
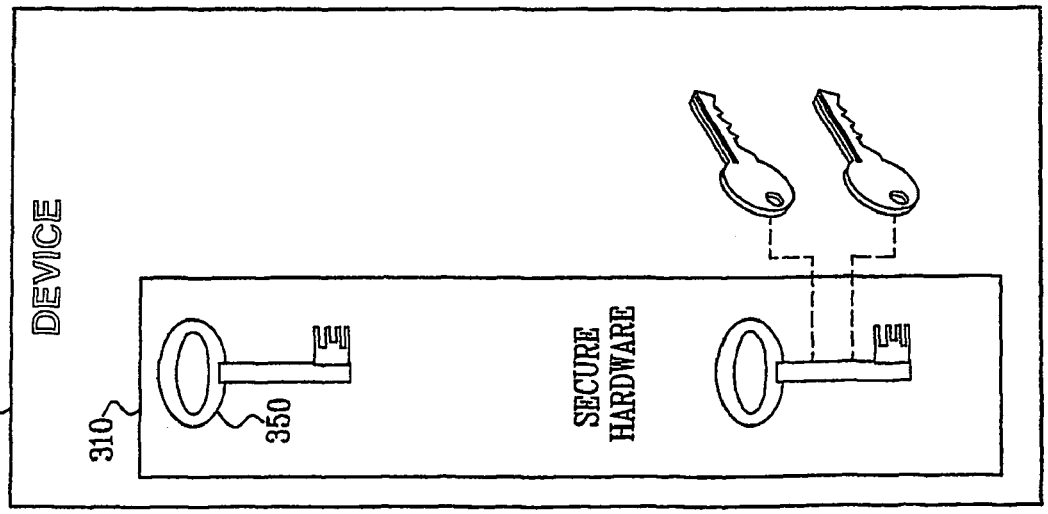

Reference is now additionally made to FIGS. 3A-3D, which depict regeneration of one period key and session keys associated with the one period key within the system of FIG. 1. Referring specifically to FIG. 3A, a first period key 300 and a second period key 305 is comprised in secure hardware 310 comprised on the secure device 320. Session keys 330 are associated with the first period key 300, and session keys 340 are associated with the second period key 305, as explained above, with reference to FIG. 1.

Returning to the general discussion of FIGS. 2 and 3A-3D, at time t1 (FIG. 2), the first period key 300 is deleted, as indicated in FIG. 3B. A new period key 350 is generated within the secure hardware 310. The replacing of the first period key 300 (FIG. 3A) with the new period key 350 (FIG. 3C) corresponds, in FIG. 2, to replacing PK1A with PK1B. As new session keys 360 (FIG. 3D) are generated, as will be explained below with reference to FIGS. 4A-4C, the new session keys 360 are associated with the new period key 350.

When a period key is regenerated, all session keys that, at the time of regeneration (t=1), are associated with the regenerated period key (PK1A→PK1B) are preferably invalidated. As depicted in FIGS. 3A-3B, session keys 330 are associated with period key 300. When the first period key 300 ceases to exit, session keys 330 are, accordingly, invalidated. Those skilled in the art will appreciate that session keys stored in insecure memory become unusable, because the period key with which the session keys stored in insecure memory are encrypted no longer exists.

Figure 4C:
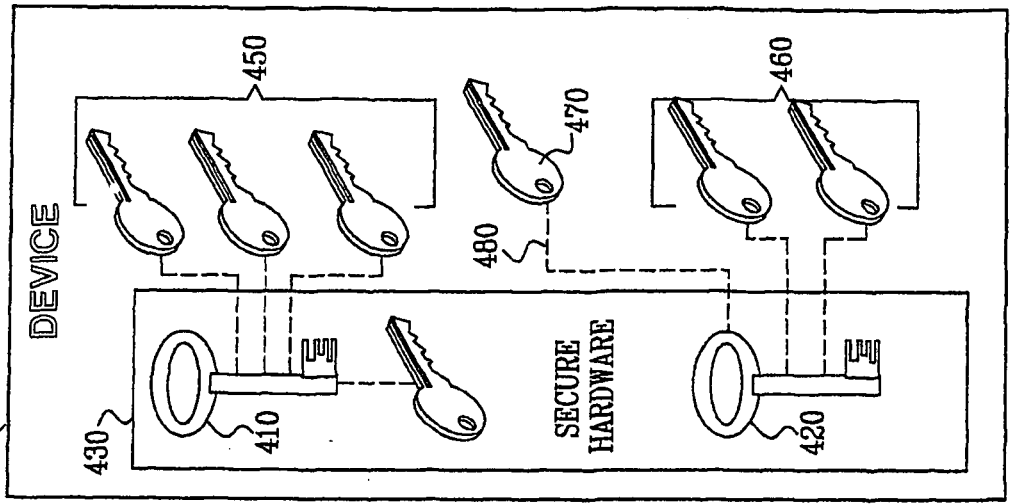
FIGS. 4A-4C depict generation of a new session key and association of the new session key with a period key within the system of FIG. 1.
Figure 4B:
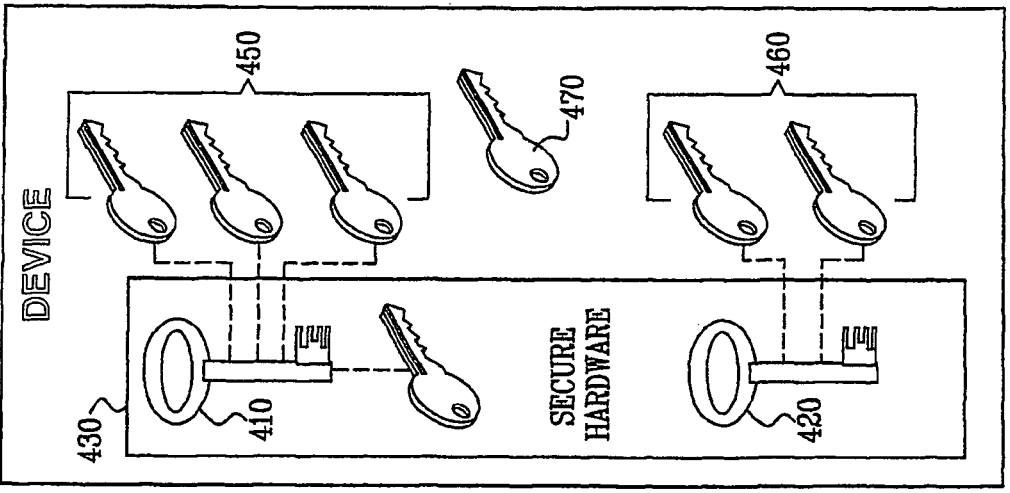
Figure 4A:
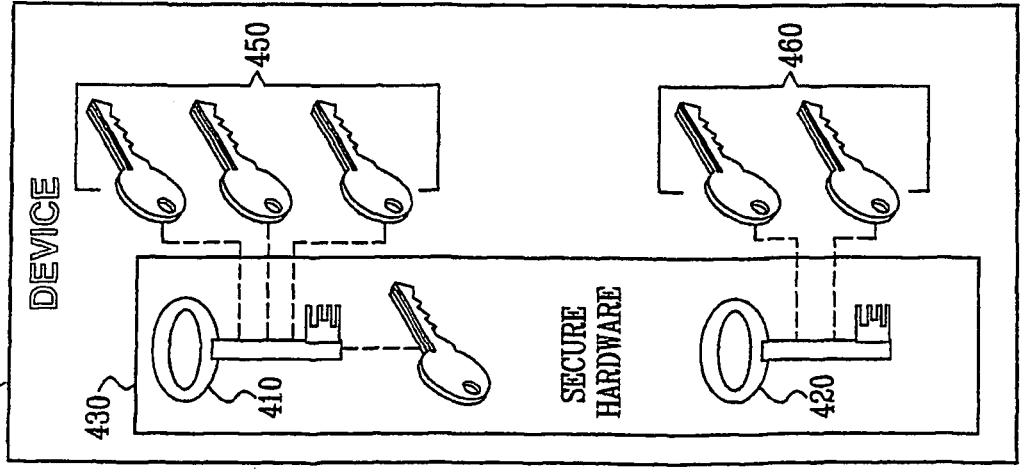

Reference is now made to FIGS. 4A-4C, which depict generation of a new session key and association of the new session key with a period key within the system of FIG. 1. FIG. 4A depicts a first period key 410 and a second period key 420. The first period key 410 and the second period key 420 are comprised in secure hardware 430. The secure hardware 430 is comprised in a secure device 440. Session keys 450, comprised both in secure hardware 430 and insecure memory, are associated (as explained above with reference to FIG. 1) with the first period key 410. Other session keys 460 (as explained above with reference to FIG. 1) are associated with the second period key 420.

Referring specifically to FIG. 4B, a new session key 470 is created, using key creation techniques well known in the art. Although the new session key 470 is depicted in an insecure portion of the secure device 440, it is appreciated that the new session key 470 is preferably created in the secure hardware 430. If a memory slot is available for the new session key 470 in the secure hardware 430, the new session key 470 is preferably stored in the available memory slot in the secure hardware 430. However, if there is no available memory slot in the secure hardware 430, the new session key 470 is preferably encrypted according to the period key 410, 420 which is not the next period key to be regenerated. The new session key 470 is then preferably swapped out to an insecure memory. Nevertheless, the new session key 470 retains the encryption, and hence the new session key 470 is preferably associated with the period key which is not the next period key to be regenerated.

FIG. 4C depicts an association 480 of the new session key 470, now in an insecure memory slot, with the second period key 420. As a consequence of the association of the new session key 470 with the second period key 420, when the second period key is regenerated, the new session key 470 is preferably invalidated and rendered unusable, as discussed above with reference to FIGS. 3A-3D. Furthermore, should a memory slot become available in the secure hardware 430, and the new session key 470 be swapped back in to the available memory slot in the secure hardware 430, because the new session key 470 is encrypted with the second period key 420, when the second period key 420 is regenerated, the new session key 470 is preferably rendered unusable due to the unavailability of an appropriate decryption key with which to decrypt the new session key 470.

It is appreciated that even if a particular session key associated with a certain period key is stored in secure hardware, when the certain period key is regenerated, the particular session key is thereby rendered invalid, thereby enforcing a period key lifetime limitation upon session keys in all cases.

It is appreciated that software components of the present invention may, if desired, be implemented in ROM (read only memory) form. The software components may, generally, be implemented in hardware, if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

What is claimed is:

1. A method for securing encryption keys, the method comprising:
    providing a first device and a second device, the first device comprising first secure hardware and first insecure hardware, and the second device comprising second secure hardware and second insecure hardware;
    generating in the first secure hardware at least two period keys, the at least two period keys stored in the first secure hardware;
    generating in the first secure hardware a plurality of session keys;
    encrypting at least a first one of the plurality of session keys generated in the first device according to a first of the at least two period keys comprised in the first secure hardware;
    encrypting at least a second one of the plurality of session keys generated in the first device according to a second of the at least two period keys comprised in the first secure hardware;
    generating in the second secure hardware at least two period keys, the at least two period keys stored in the second secure hardware;
    generating in the second secure hardware a plurality of session keys;
    encrypting at least a first one of the plurality of session keys generated in the second device according to a first of the at least two period keys comprised in the second secure hardware;
    encrypting at least a second one of the plurality of session keys generated in the second device according to a second of the at least two period keys comprised in the second secure hardware;
    decrypting one encrypted session key in the first device and decrypting one encrypted session key in the second device; and
    establishing an encrypted session between first device and the second device, the encrypted session being encrypted according to the one decrypted session key in the first device and the one decrypted session key in the second device,
    wherein the at least two period keys comprised in the first device and the at least two period keys comprised in the second device are periodically regenerated in order to produce new period keys, thereby rendering useless any session keys encrypted according to an old period key.

2. The method according to claim 1 and wherein the decrypting occurs when an encrypted session is to be established between the first device and the second device.

3. The method according to claim 1 and wherein, after generating the plurality of session keys in the first secure hardware, at least one of the plurality of the session keys generated in the first secure hardware is stored in the first secure hardware.

4. The method according to claim 1 and wherein, after generating the plurality of session keys in the first secure hardware, at least one of the plurality of the session keys generated in the first secure hardware is stored in the first insecure hardware.

5. The method according to claim 1 and wherein, after generating the plurality of session keys in the second secure hardware, at least one of the plurality of the session keys generated in the second secure hardware is stored in the second secure hardware.

6. The method according to claim 1 and wherein, after generating the plurality of session keys in the second secure hardware, at least one of the plurality of the session keys generated in the second secure hardware is stored in the second insecure hardware.

7. The method according to claim 1 and wherein a period for regenerating the at least two period keys comprised in the first device is not equal to a period for regenerating the at least two period keys comprised in the second device.

8. The method according to claim 1 and wherein the regeneration of the at least two period keys comprised in the first device occurs in the first secure hardware.

9. The method according to claim 1 and wherein the regeneration of the at least two period keys comprised in the second device occurs in the second secure hardware.

10. The method according to claim 1 and wherein a time value of the period for regenerating the at least two period keys comprised in the first device is comprised in a first signed self-certificate.

11. The method according to claim 10 and wherein the first signed self-certificate comprises a self-certificate internally verified by the first secure hardware.

12. The method according to claim 7 and wherein the period for regenerating the at least two period keys comprised in the first device is regulated by a secure timer.

13. The method according to claim 1 and wherein a time value of the period for regenerating the at least two period keys comprised in the second device is comprised in a second signed self-certificate.

14. The method according to claim 13 and wherein the second signed self-certificate comprises a self-certificate internally verified by the second secure hardware.

15. The method according to claim 7 and wherein the period for regenerating the at least two period keys comprised in the second device is regulated by a secure timer.

16. The method according to claim 1 and wherein, during regeneration of one of the two period keys comprised in the first device, the one of the two period keys is deleted from the first device.

17. The method according to claim 1 and wherein, during regeneration of one of the two period keys comprised in the second device, the one of the two period keys is deleted from the second device.

18. The method according to claim 1 and wherein the periodically regenerating in order to produce new period keys comprised in the first device occurs in the first secure hardware.

19. The method according to claim 1 and wherein the periodically regenerating in order to produce new period keys comprised in the second device occurs in the second secure hardware.

20. The method according to claim 1 and wherein at a time when a period key is regenerated, the at least one of the plurality of session keys encrypted according to the period key which is regenerated is invalidated.

21. A system for securing encryption keys, the system comprising:
- a first device comprising first secure hardware and first insecure hardware;
- a second device comprising second secure hardware and second insecure hardware;
- a first period key generator comprised in the first secure hardware operative to generate at least two period keys, the at least two period keys stored in the first secure hardware;
- a first session key generator comprised in the first secure hardware operative to generate a plurality of session keys;
- a first encryptor comprised in the first secure hardware operative to encrypt at least a first one of the plurality of session keys generated in the first device according to a first of the at least two period keys comprised in the first secure hardware;
- a second encryptor comprised in the first secure hardware operative to encrypt at least a second one of the plurality of session keys generated in the first device according to a second of the at least two period keys comprised in the second secure hardware;
- a second period key generator comprised in the second secure hardware operative to generate at least two period keys, the at least two period keys stored in the second secure hardware;
- a second session key generator comprised in the second secure hardware operative to generate a plurality of session keys;
- a third encryptor comprised in the second secure hardware operative to encrypt at least a first one of the plurality of session keys generated in the second device according to a first of the at least two period keys comprised in the second secure hardware;
- a fourth encryptor comprised in the second secure hardware operative to encrypt at least a second one of the plurality of session keys generated in the second device according to a second of the at least two period keys comprised in the second secure hardware;
- a first decryptor operative to decrypt one encrypted session key in the first device;
- a second decryptor operative to decrypt one encrypted session key in the second device; and
- an encrypted session between first device and the second device, the encrypted session being encrypted according to the one decrypted session key in the first device and the one decrypted session key in the second device,
- wherein the at least two period keys comprised in the first device and the at least two period keys comprised in the second device are periodically regenerated in order to produce new period keys, thereby rendering useless any session keys encrypted according to an old period key.

22. A system for securing encryption keys, the system comprising:
- a first device and a second device, the first device comprising first secure hardware and first insecure hardware, and the second device comprising second secure hardware and second insecure hardware;
- means for generating in the first secure hardware at least two period keys, the at least two period keys stored in the first secure hardware;
- means for generating in the first secure hardware a plurality of session keys;
- means for encrypting at least a first one of the plurality of session keys generated in the first device according to a first of the at least two period keys comprised in the first secure hardware;
- means for encrypting at least a second one of the plurality of session keys generated in the first device according to a second of the at least two period keys comprised in the first secure hardware;
- means for generating in the second secure hardware at least two period keys, the at least two period keys stored in the second secure hardware;
- means for generating in the second secure hardware a plurality of session keys;
- means for encrypting at least a first one of the plurality of session keys generated in the second device according to a first of the at least two period keys comprised in the second secure hardware;
- means for encrypting at least a second one of the plurality of session keys generated in the second device according to a second of the at least two period keys comprised in the second secure hardware;
- means for decrypting one encrypted session key in the first device and decrypting one encrypted session key in the second device; and
- means for establishing an encrypted session between first device and the second device, the encrypted session being encrypted according to the one decrypted session key in the first device and the one decrypted session key in the second device,
- wherein the at least two period keys comprised in the first device and the at least two period keys comprised in the second device are periodically regenerated in order to produce new period keys, thereby rendering useless any session keys encrypted according to an old period key.

* * * * *